US008832845B2

(12) United States Patent
Spooren et al.

(10) Patent No.: US 8,832,845 B2
(45) Date of Patent: Sep. 9, 2014

(54) APPARATUS, METHOD AND PROGRAM

(75) Inventors: Jan Spooren, Schoten (BE); Anatolity Lubashevskiy, Antwerp (BE)

(73) Assignees: Sony Europe Limited, Weybridge (GB); Sony Corporation of America, New York, NY (US)

( * ) Notice: Subject to any disclaimer, the term of this patent is extended or adjusted under 35 U.S.C. 154(b) by 511 days.

(21) Appl. No.: 13/209,851

(22) Filed: Aug. 15, 2011

(65) Prior Publication Data

US 2012/0054719 A1 Mar. 1, 2012

(30) Foreign Application Priority Data

Aug. 25, 2010 (GB) .................................. 1014180.2

(51) Int. Cl.
*G06F 7/04* (2006.01)
*G06F 21/14* (2013.01)
*G06F 17/30* (2006.01)
(52) U.S. Cl.
CPC .......... *G06F 17/30023* (2013.01); *G06F 21/14* (2013.01); *G06F 17/30823* (2013.01)
USPC ......................................................... 726/26
(58) Field of Classification Search
CPC ........ G06F 21/14; G06F 21/565; G06F 21/60
USPC ......................................................... 726/26
See application file for complete search history.

(56) References Cited

U.S. PATENT DOCUMENTS

| 6,205,429 | B1 | 3/2001 | Peng |
| 6,934,810 | B1 * | 8/2005 | Williams et al. .............. 711/137 |
| 2004/0128535 | A1 | 7/2004 | Cheng |
| 2004/0148399 | A1 | 7/2004 | Fenizia et al. |
| 2004/0267953 | A1 | 12/2004 | Dunbar et al. |
| 2005/0216611 | A1 * | 9/2005 | Martinez ......................... 710/22 |
| 2007/0162852 | A1 | 7/2007 | Jung et al. |
| 2007/0168707 | A1 * | 7/2007 | Kern et al. ........................ 714/6 |
| 2010/0106920 | A1 | 4/2010 | Anckaert et al. |
| 2010/0138777 | A1 | 6/2010 | Nishina et al. |
| 2010/0274788 | A1 | 10/2010 | Coker |

OTHER PUBLICATIONS

United Kingdom Search Report issued on Nov. 9, 2010 in corresponding United Kingdom Application No. 1014180.2 filed on Aug. 25, 2010.

* cited by examiner

*Primary Examiner* — Mohammad W Reza
(74) *Attorney, Agent, or Firm* — Oblon, Spivak, McClelland, Maier & Neustadt, L.L.P.

(57) ABSTRACT

A method of processing media using a first software component and a second software component is described. In the method the first software component is operable to write data to a first buffer and the second software component is operable to read the data from the first buffer, the method comprising: processing the media using the first software component; determining a second buffer location, different to the first buffer location; storing the processed media in the second buffer location; generating an obfuscated handle, wherein the handle identifies the second buffer location; storing the obfuscated handle at the first buffer location; and resolving in the second software component the obfuscated handle using a resolving mechanism and in response to said resolution of the obfuscated handle, retrieving the processed media from the second buffer location identified by the handle.

17 Claims, 5 Drawing Sheets

APPARATUS, METHOD AND PROGRAM

BACKGROUND OF THE INVENTION

1. Field of the Invention

The present invention relates to an apparatus, method and program.

2. Brief Description of the Prior Art

Media is commonly reproduced on computers. In orders to reproduce and playback media on a computer, many different types of software are used. These interact with different operating systems (OS) used in computers to playback the media. One such piece of software is DirectShow framework which is used in the Windows OS and which is developed by Microsoft®.

With the increase in the use of computer systems to view media, there is a corresponding increase in the amount of unauthorised viewing and copying of content by unscrupulous users. In order to ensure that the intellectual property rights of the content producers and providers is secured, the use of the media on computers can be controlled using tamper resistance techniques. However, some hackers try to circumvent the tamper resistance techniques using different hacking techniques.

The present invention aims to make it more difficult for hackers to circumvent the tamper resistance techniques when playing back media.

SUMMARY OF THE INVENTION

According to a first aspect of the present invention there is provided a method of processing media using a first software component and a second software component, wherein the first software component is operable to write data to a first buffer and the second software component is operable to read the data from the first buffer, the method comprising: processing the media using the first software component; determining a second buffer location, different to the first buffer location; storing the processed media in the second buffer location; generating an obfuscated handle, wherein the handle identifies the second buffer location; storing the obfuscated handle at the first buffer location; and resolving in the second software component the obfuscated handle using a resolving mechanism and in response to said resolution of the obfuscated handle, retrieving the processed media from the second buffer location identified by the handle.

The second buffer location may be determined dynamically between successive pieces of processed media.

The second buffer location between successive pieces of processed media may be non-contiguous.

The obfuscated handle may be an encrypted pointer.

The resolving mechanism may comprise: generating a plurality of random numbers; associating each random number with a plurality of decryption key, whereby said encrypted pointer is decrypted using one of the associated decryption keys; and providing the random number associated with the decryption key corresponding to the encryption key used to encrypt the pointer to the second software component.

The random number may be encrypted using an encryption key different to the encryption key used to encrypt the pointer, wherein the second software component decrypts the encrypted random number prior to resolving the handle.

The method may further comprise processing the media retrieved from the second buffer location using the second software component, storing the processed media output from the second software component in a third buffer location, different to the first and second buffer location; and reproducing the media stored at the third buffer location.

The first and second components may be arranged in a framework structure.

The first and second components may be DirectShow software components.

According to another aspect, there is provided a computer program containing computer readable instructions which when loaded onto a computer configure the computer to perform a method according to any one of the embodiments of the invention.

A storage medium configured to store the computer program therein or thereon is also envisaged.

According to another aspect of the invention, there is provided an apparatus comprising a first and second buffer and a processor operable to process media using a first software component and a second software component, wherein the first software component is operable to write data to the first buffer and the second software component is operable to read the data from the first buffer, wherein the processor is operable to: process the media using the first software component; determine the second buffer location, different to the first buffer location; store the processed media in the second buffer location; generate an obfuscated handle, wherein the handle identifies the second buffer location; store the obfuscated handle at the first buffer location; and resolve in the second software component the obfuscated handle using a resolving mechanism and in response to said resolution of the obfuscated handle, to retrieve the processed media from the second buffer location identified by the handle.

The second buffer location may be determined dynamically between successive pieces of processed media.

The second buffer location between successive pieces of processed media may be non-contiguous.

The obfuscated handle may be an encrypted pointer.

The processor may be operable such that the resolving mechanism includes: generating a plurality of random numbers; associating each random number with a plurality of decryption keys, whereby said encrypted pointer is decrypted using one of the associated decryption keys; and providing the random number associated with the decryption key corresponding to the encryption key used to encrypt the pointer to the second software component.

The random number may be encrypted using an encryption key different to the encryption key used to encrypt the pointer, wherein the second software component decrypts the encrypted random number prior to resolving the handle.

The processor may be operable to process the media retrieved from the second buffer location using the second software component, store the processed media output from the second software component in a third buffer location, different to the first and second buffer location; and reproduce the media stored at the third buffer location.

The first and second components may be arranged in a framework structure.

The first and second components may be DirectShow software components.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
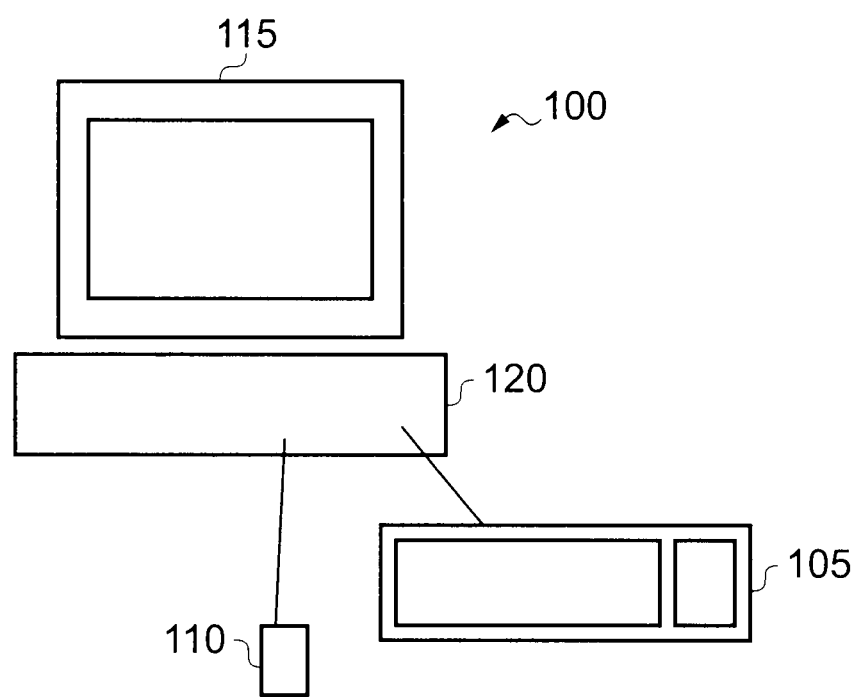
FIG. 1 shows a computer system upon which a computer program according to embodiments of the present invention is run.

Referring to FIG. 1, a computer system 100 having a computer 120 and a display 115 is shown. In order to control the computer 120, the user operates user input devices such as a mouse 110 and/or a keyboard 105. The computer 120 has storage media. The storage may be an internal or external hard disk or may be semi-conductor memory or the like. On the storage media is stored not only the OS used to operate the computer 120, but also the media which is to be displayed to the user on the display 115. However, it is envisaged that the invention is not so limited and that the media may be stored separately to the OS. In order to save storage space, the media is usually encoded in a particular format. For example, for music, the .mp3 format and for video, the MPEG formats are both popular. Additionally, in order to protect the content, the encoded media is stored usually in encrypted form. This means that the storage media which stores the media stores encoded and encrypted media content.

In the specific embodiments, the computer system is a personal computer running the Microsoft® Windows OS. However, the invention is not limited and the computer system may be any type of computer device such as a laptop, personal audio device, mobile (cell) phone or the like. Indeed, the OS may be any type of appropriate OS, such as Linux, or any type of OS suitable for the computer device, such as Android if the device is a mobile phone.

Figure 2:
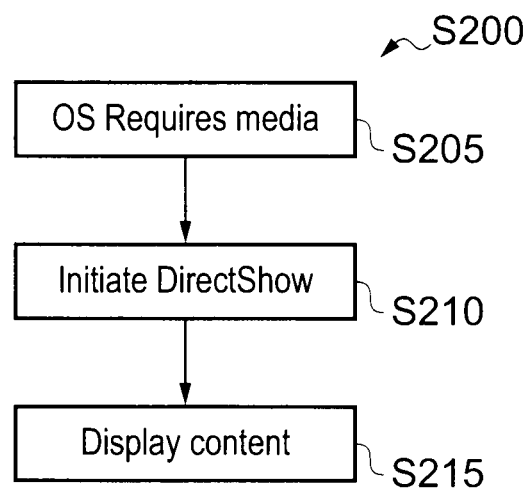
FIG. 2 shows a flow diagram explaining the display of media on a computer.

Referring to FIG. 2, the user identifies the piece of media they wish to view. This identification may be by clicking the mouse 110 over a certain icon located on the display 115. When the user identifies the media, the OS runs a media viewing procedure 5200. This is explained briefly in FIG. 2.

If a user of the computer system 100 wants to play a piece of media content, such as video or music, the user will highlight the media content on the display 115 using the mouse 110. The user then asks the computer system to play the media. This is usually achieved by double clicking the mouse over the icon, which is a representation of the media. The OS opens an appropriate program (such as Windows Media Player® developed by Microsoft®) and sends a request to the program identifying the media to be played. This occurs in step S205.

In this case, the program initiates the DirectShow framework in step S210. Although the DirectShow framework will be explained in more detail later, the purpose of the Direct-Show framework is to retrieve the appropriate encoded and encrypted media from the storage media, decrypt the media, decompress/decode the decrypted media and render the content for display of the content S215 to the user. The content is typically retrieved by the DirectShow framework and displayed by the software using the DirectShow framework.

The DirectShow framework consists of a number of different framework components (referred to as filters) which are each responsible for different tasks. Typically, a filter has inputs and/or outputs, although it is possible for filters to have no input or no output. Where applicable, these inputs and outputs are called pins. A filter receives the content from the previous filter and performs the relevant task on the content. This media which has been processed is then passed to its output pin where it is passed to the subsequent filter. It should be noted here that in embodiments, the filters are implemented as computer software components, although the invention is not so limited. In fact, the filters may be implemented in hardware, such as an Application Specific Integrated Circuit (ASIC) or the like.

Figure 3:
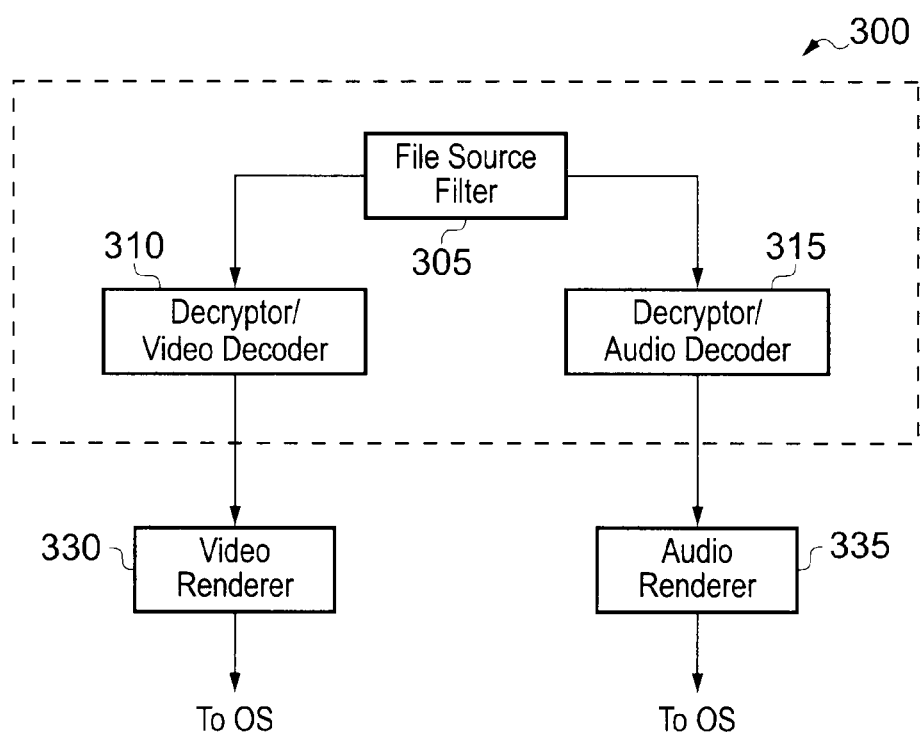
FIG. 3 shows a diagram explaining a conventional method for displaying media on a computer.

Referring to FIG. 3, a conventional method of operation of a DirectShow framework 300 is shown. After the OS instructs the software application using a DirectShow framework to show a selected piece of content, a file source filter 305 retrieves the relevant content from the storage media. As noted above, this content is stored in an encrypted and encoded form. In the following, the content is a movie clip. As the skilled person will appreciate, the software application using the DirectShow framework provides details of the first frame in the movie clip to be recovered. The timing of the recovery of the media is also provided by the DirectShow framework. In other words, the software application using the DirectShow framework controls the first frame and the DirectShow framework controls the frames and synchronisation amongst other things until a subsequent seek, stop or pause command. The file source filter 305 demultiplexes the encrypted and encoded movie clip into an audio stream and a separate video stream. This data is stored at a first buffer address and a second buffer address respectively within the computer system 100. The first and second buffer addresses are easily discernible to a third party who has access to Direct-Show diagnostic tools as the location of the buffers where content is stored whilst being displayed is discernible from the DirectShow framework by diagnostic tools. Clearly, if the content is purely audio, such as a piece of music, or a piece of video without sound, then there is no requirement to demultiplex the content. Additionally, if the content includes textual data, such as closed captions, then this would be demultiplexed by the file source filter 305 although the demultiplexer can be implemented as a separate component.

The encrypted and encoded audio stream and the encrypted and encoded video stream are stored within a first and second buffer respectively. The address of the first buffer (hereinafter the "first buffer address") and the address of the second buffer (hereinafter the "second buffer address") are chosen by the application using the DirectShow framework. The encrypted and encoded audio stream and the encrypted and encoded video stream are then passed to different filters within the DirectShow framework. In embodiments, the file source filter 305 passes the encrypted and encoded audio and video stream to the appropriate decryptor/decoder. Specifically, the audio stream is passed to the audio decryptor/decoder 315 and the video stream is passed to the video decryptor/decoder 310. The audio decryptor/decoder 315 decrypts the encoded audio stream and decodes the decrypted encoded audio stream. Similarly, the video decryptor/decoder 310 decrypts the encoded video stream and decodes the decrypted encoded video stream. Therefore, the output of the audio decryptor/decoder 315 and the output of the video decryptor/decoder 310 is unencrypted decoded audio and video data, respectively. This unencrypted decoded audio and video data is stored in buffers at a third and fourth buffer address, respectively within the computer system 100.

The output of the audio decryptor/decoder 315 is sound samples. Similarly, the output of the video decryptor 310 is raw pixel data.

Finally, the raw audio data stored at the third buffer address is used by an audio renderer 335 (which is part of the software using the DirectShow framework and not the framework itself) which passes the audio samples to the sound card for playing over speakers (not shown) attached to the computer system 100. Similarly, the raw pixel data stored at the fourth buffer address is fed into a video renderer 330 which passes the raw pixel data to the video card for display using the display device 115 attached to, or integrated with, the computer system 100.

As noted above, the software using the DirectShow framework provides details of the frames to be recovered as well as controlling the storage of the unencrypted media. As the interfaces between the software using the DirectShow framework and the DirectShow framework are easily discernible, the unscrupulous hacker can obtain the decrypted media. As the DirectShow framework for handling multimedia content is disseminated widely, using DirectShow diagnostic tools, it is possible for hackers to obtain the address of the first and second buffer and to copy the desired content from those buffers. This is a problem that embodiments of the current invention aim to address.

Figure 4:
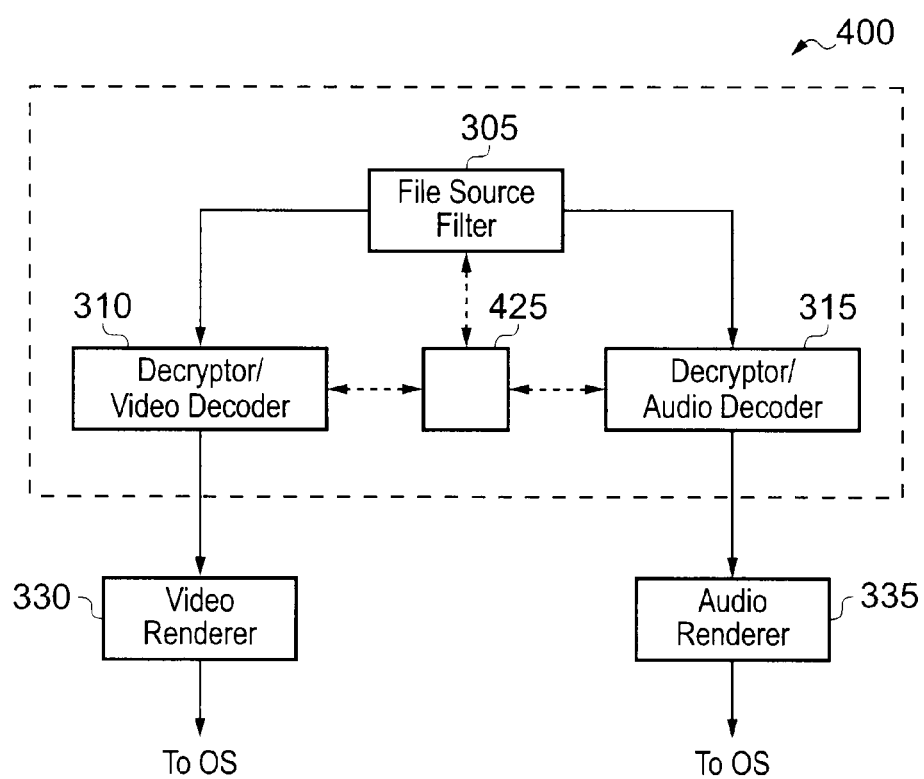
FIG. 4 shows a diagram explaining a method for displaying media on a computer according to embodiments of the present invention.

Referring to FIG. 4, an embodiment of the present invention will now be explained. It should be noted here that for brevity, only the method of handling video media will be explained. Therefore, although the audio decryptor/decoder 315 and the audio renderer 335 are shown in FIG. 4, they will not be referred to directly. As the skilled person would also appreciate, the invention is not only limited to just video and any type of data such as audio, textual data or the like could be handled in addition to or instead of the video data.

During initialisation of the DirectShow framework in the embodiment of FIG. 4, a table of random numbers is generated by a DirectShow application 425. The DirectShow application 425 controls where the actual video is stored during processing. The table of random numbers is shared between the DirectShow application 425 and each of the filters in the framework. The DirectShow application 425 stores this table along with a set of encryption keys which correspond to a particular decryption key. Each of the filters stores the table. Associated with each random number is a decryption key. Also, a separate global decryption key is distributed to each of the filters. The distribution of the global decryption key may be done prior to initialisation, or at initialisation.

Additionally, the DirectShow application 425 generates a random number based on certain parameters of the frame to be retrieved during the initialised framework. This random number is encrypted using the global encryption key. The encrypted random number is sent to each of the filters in the DirectShow framework.

As explained with reference to FIG. 3, the video media is stored on the computer 120 or at least accessible by the computer 120. Specifically, the video media is stored in an encrypted format on a storage medium within the computer 120, although the invention is not so limited and the media may be stored elsewhere and accessible by the computer 120. When the OS requests that the video media is played, the OS starts software which uses a DirectShow framework. The software that uses the DirectShow framework configures the DirectShow framework such that the DirectShow framework fetches and plays a particular piece of video media. This may be a frame of video media for example. Unlike the example of FIG. 3, in FIG. 4 a separate DirectShow application component 425 is provided which controls where the actual video media is stored during processing. In other words, in the embodiment of FIG. 4, the software that uses the DirectShow framework does not control where the actual video is stored during the processing of the frame of video; the actual buffer location of the video during processing is controlled by the separate DirectShow application 425. This means that the DirectShow application 425 controls where the video media is actually stored during the processing of the video media retrieved by the computer 120. The buffer address chosen by the DirectShow application 425 is different to the buffer address that would be selected by the DirectShow framework.

As in FIG. 3, the DirectShow framework first runs a file source filter 305 which retrieves the appropriate encrypted media from the computer 120. The file source filter 305 demultiplexes the media to retrieve the encrypted video media. In the embodiment of FIG. 4, the encrypted video media is not written to the buffer allocated by the software using the DirectShow framework, as is the case in FIG. 3. In the embodiment of FIG. 4, the encrypted video media is written to the first buffer address chosen by the DirectShow application 425. In other words, the DirectShow application 425 determines the first buffer address where the encrypted media is to be stored and generates a handle identifying this first buffer address.

In the following, the term "handle" is used to mean a value through which a resource such as a memory buffer or file can be accessed and/or manipulated. The handle may be a pointer, an encrypted pointer an index to a resource allocation table or any appropriate value through which a resource can be referenced. This handle is obfuscated so that it is unintelligible to the hacker. Indeed, it should be noted that the details of the mechanism that associates the resource to the handle are hidden behind the handle abstraction. This means by seeing the handle, without knowing the mechanism behind the handle, does not provide details of the resource to which the handle refers. So, if a hacker were to see the handle, the handle does not provide any details of the resource to which the handle refers. However, as the DirectShow framework does know the handle abstraction, the DirectShow framework knows the resource to which the handle refers. In the following specific embodiments, the handle is an encrypted pointer.

In order to ensure that the DirectShow framework meets the protocol, the pointer directing the subsequent filter to the first buffer address that stores the media is stored at the first buffer address allocated by the DirectShow framework. However, as already noted, the actual processed video is stored at the first buffer address allocated by the software running the DirectShow application 425. This means that should a third party analyse the operation of the DirectShow framework using a diagnostic tool, the third party would only see the encrypted pointer at the first buffer address allocated by the software running the DirectShow application which identifies the first buffer address allocated by the DirectShow controller 425 where the media is stored. As noted above, because the encrypted pointer does not provide to the unauthorised user any information of the resource to which the pointer refers, the third party would not be able to easily determine the first buffer address allocated by the software running the DirectShow application which is where the video media is stored.

In order for the file source filter 305 to store the encrypted video media after the video media has been processed by the file source filter 305 at the first buffer address determined by the DirectShow application 425, the file source filter 305 is provided with the encrypted pointer indicating the first buffer address chosen by the DirectShow application 425. Given the pointer is encrypted, the integrity of the pointer is secure.

The mechanism by which the file source filter 305 determines the pointer will now be described. The DirectShow application 425 selects the encryption key associated with the random number generated during initialisation and encrypts the pointer using the encryption key located in the look up table. The encrypted pointer (which is one example of an obfuscated handle) is then sent to the file source filter 305.

Upon receipt of the encrypted pointer, the file source filter 305 selects the appropriate decryption key from the look up table which was selected by the random number sent during initialisation. The encrypted pointer is then decrypted using this key to provide a pointer to the first buffer address selected by the DirectShow application 425. It should be noted here that by providing the random number encrypted using a global key and selecting the key for the pointer in dependence of the random number, the secrecy of the global key is maintained for longer whilst still allowing the creation of short lived session keys.

Additionally, the file source filter 305 writes the encrypted pointer to the first buffer address provided by the DirectShow framework and writes the processed encrypted video media to the buffer at the first buffer address provided by the DirectShow application 425.

As noted above, the first buffer address allocated by the DirectShow framework has the encrypted pointer written thereto. As the first buffer address is allocated by the DirectShow framework, the video decryptor/decoder 310 obtains the encrypted pointer from the first buffer address. As the video decryptor/decoder 310 received the random number encrypted using the global key during initialisation, the video decryptor/decoder 310 decrypts the random number using the global decryption key to establish the random number. The video decryptor/decoder 310 then decrypts the pointer using the appropriate decryption key selected from the look up table using the random number. The video decryptor/decoder 310 then retrieves the video from the first buffer address chosen by the DirectShow application 425. The video decryptor/decoder 310 then performs decryption and decoding of the video.

The video decryptor/decoder 310 decrypts and decodes the video and stores the video at a buffer address selected by the DirectShow framework. This is because the next stage for the decrypted and decoded video is to be utilised by the video renderer 330. The video renderer 330 forms part of the software using the DirectShow framework rather than the DirectShow framework. Therefore, the video renderer 330 will not be provided with the encryption/decryption keys nor the look-up table to ensure security of the system.

The video renderer 330 retrieves the video stored at the buffer address selected by the DirectShow framework and displays this using the video card.

Figure 5:
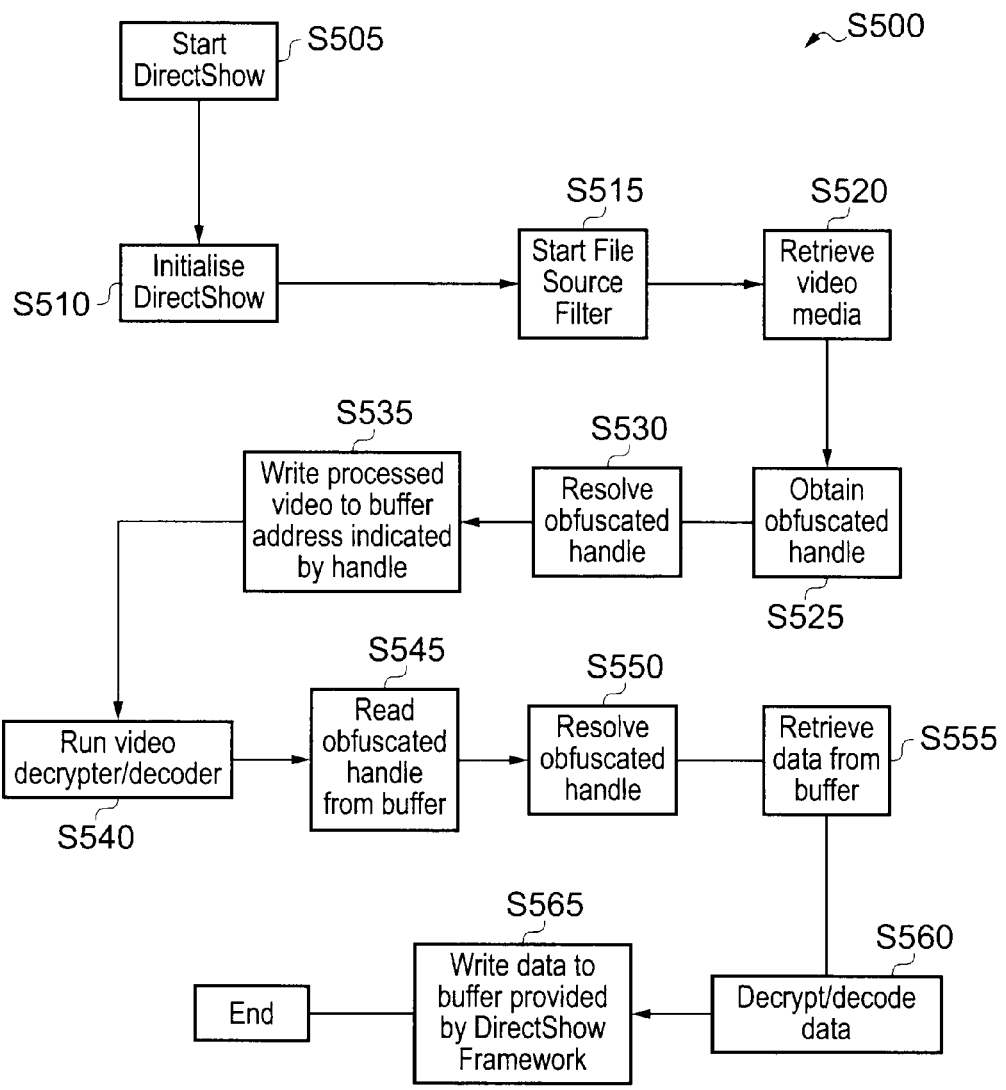
FIG. 5 shows a flow chart describing the method FIG. 4.

Referring to FIG. 5, a flow diagram explaining the process carried out by the computer system 100 is explained. Step S500 describes the process carried out by the computer system 100 when the user wishes to view a piece of video on the display 115. The user accesses a piece of video and the software that uses the DirectShow framework starts the DirectShow framework S505. The DirectShow framework is then initialised S510. The DirectShow framework runs the file source filter S515. The file source filter retrieves the encrypted video media from the computer 120 in S520. The encrypted handle is obtained from the DirectShow application 425 in step S525. The encrypted handle is decrypted using the decryption key indicated by the DirectShow application 425 using the random number in Step S530. The file source filter writes the processed video to the buffer address indicated by the decrypted pointer in step S535. Also, the encrypted pointer is written to the buffer address which is allocated by the DirectShow framework.

The video decryptor/decoder is then started S540. The encrypted pointer is read from the buffer allocated by the DirectShow framework S545. The encrypted pointer is decrypted to obtain the pointer and thus establish the buffer address where the processed video is stored. This data is then retrieved in step S555. The data is decrypted and decoded (step S560). The decrypted and decoded data is written to the buffer provided by the DirectShow framework (Step S565). The DirectShow framework then ends as the decrypted and decoded video is read by the renderer which is not part of the DirectShow framework.

In embodiments, either the global key or the key generated at initialisation may be unique to the user or to the actual software running on the system. For example, the encryption and decryption key generation function may be generated using the unique reference attributed to the OS by the OS developer or by information specific to the user such as date of birth, address, email address, password or the like.

Moreover, the handle may need not be an encrypted pointer. Indeed, the handle may not be encrypted at all. The handle may obfuscated or made unintelligible to the observer. The handle may be made unintelligible using any technique such as creating a substitute value for the buffer address, or creating a handle value for the real address value, or indeed the correct buffer address may be located in a look up table and the obfuscated buffer address is simply a pointer to the appropriate location in the look-up table.

Although the foregoing has identified certain processes such as decrypting and decoding as being part of the DirectShow framework, the invention is not so limited. The decrypting function provided in the decryptor/decoder noted above can be carried out by the software which uses the DirectShow framework.

It is envisaged that the above method, in embodiments will be provided in computer software. Such software will contain computer readable instructions, which when loaded onto a computer, configure the computer to perform the above method. The computer readable instructions typically are written in a computer language such as C or C++. The computer readable instructions will be stored within the computer. These instructions may be stored on a magnetic or optically readable medium. Also, the instructions may be stored on solid state memory or the like. Additionally, the instructions may be stored on a server for distribution over a network such as a Local Network or the Internet or the like. The instructions may therefore be embodied as signals which are transmittable over a network.

Although the foregoing has been described using DirectShow as an example, the invention is not so limited. Embodiments of the present invention may be implemented using any media reproduction technique. Additionally, although the foregoing uses pointers to direct the component to the correct obfuscated buffer, the invention is not limited. Any mechanism that redirects the component to the correct obfuscated buffer, such as a handle or the like is envisaged.

Although illustrative embodiments of the invention have been described in detail herein with reference to the accompanying drawings, it is to be understood that the invention is not limited to those precise embodiments, and that various changes and modifications can be effected by therein by one skilled in the art without departing from the scope and spirit of the invention as defined by the appended claims.

We claim:

1. A method of processing media using a first software component and a second software component with circuitry, wherein the first software component is operable to write data to a first buffer and the second software component is operable to read the data from the first buffer, the method comprising:

processing the media using the first software component;
determining a second buffer location of a second buffer, different to a first buffer location of the first buffer;

storing the processed media in the second buffer location;
generating an obfuscated handle, wherein the handle identifies the second buffer location wherein the obfuscated handle is an encrypted pointer;
storing the obfuscated handle at the first buffer location;
providing a random number of a plurality of random numbers to the second software component; and
resolving in the second software component the obfuscated handle by using a decryption key of a plurality of decryption keys, the decryption key corresponding to a first encryption key used to obfuscate the handle, the decryption key being identified by using the random number provided to the second software component, each of the plurality of random numbers being associated with each of the plurality of decryption keys, and in response to said resolving of the obfuscated handle, retrieving the processed media from the second buffer location identified by the handle wherein the random number is encrypted using a second encryption key different to the first encryption key used to encrypt the pointer, wherein the second software component decrypts the encrypted random number prior to resolving the obfuscated handle.

2. The method according to claim 1, wherein the second buffer location is determined dynamically between successive pieces of the processed media.

3. The method according to claim 1, wherein the second buffer location between successive pieces of the processed media are non-contiguous.

4. The method according to claim 1, further comprising:
generating the plurality of random numbers;
associating each of the plurality of random numbers with the plurality of decryption keys.

5. The method according to claim 1, further comprising:
processing the media retrieved from the second buffer location using the second software component, storing the processed media output from the second software component in a third buffer location, different to the first and second buffer location; and reproducing the media stored at the third buffer location.

6. The method according to claim 1, wherein the first and second software components are arranged in a framework structure.

7. The method according to claim 1 wherein the first and second software components are DirectShow software components.

8. The method according to claim 1, further comprising generating a table of the plurality of random numbers and the plurality of decryption keys.

9. The method according to claim 8, further comprising displaying the processed media by a renderer, wherein the renderer is not provided with the table.

10. A non-transitory computer readable medium including executable instructions, which when executed by a computer cause the computer to execute a method of processing media using a first software component and a second software component, wherein the first software component is operable to write data to a first buffer and the second software component is operable to read the data from the first buffer, the method comprising:
processing the media using the first software component;
determining a second buffer location of a second buffer, different to a first buffer location of the first buffer;
storing the processed media in the second buffer location;
generating an obfuscated handle, wherein the handle is an encrypted pointer identifies the second buffer location;
storing the obfuscated handle at the first buffer location;
providing a random number of a plurality of random numbers to the second software component; and
resolving in the second software component the obfuscated handle by using a decryption key of a plurality of decryption keys, the decryption key corresponding to a first encryption key used to obfuscate the handle, the decryption key being identified by using the random number provided to the second software component, each of the plurality of random numbers being associated with each of the plurality of decryption keys, and in response to said resolving of the obfuscated handle, retrieving the processed media from the second buffer location identified by the handle wherein the random number is encrypted using a second encryption key different to the first encryption key used to encrypt the pointer, wherein the second software component decrypts the encrypted random number prior to resolving the obfuscated handle.

11. An apparatus comprising a memory of a first and second buffer and a processor operable to process media using a first software component and a second software component, wherein the first software component is operable to write data to the first buffer and the second software component is operable to read the data from the first buffer, wherein the processor is operable to:
process the media using the first software component;
determine a second buffer location of a second buffer, different to a first buffer location of the first buffer;
store the processed media in the second buffer location;
generate an obfuscated handle, wherein the handle is an encrypted pointer identifies the second buffer location;
store the obfuscated handle at the first buffer location;
provide a random number of a plurality of random numbers to the second software component; and
resolve in the second software component the obfuscated handle by using a decryption key of a plurality of decryption keys, the decryption key corresponding to a first encryption key used to obfuscate the handle, the decryption key being identified by using the random number provided to the second software component, each of the plurality of random numbers being associated with each of the plurality of decryption keys, and in response to said resolution of the obfuscated handle, to retrieve the processed media from the second buffer location identified by the handle wherein the random number is encrypted using a second encryption key different to the first encryption key used to encrypt the pointer, wherein the second software component decrypts the encrypted random number prior to resolving the obfuscated handle.

12. The apparatus according to claim 11, wherein the second buffer location is determined dynamically between successive pieces of the processed media.

13. The apparatus according to claim 11, wherein the second buffer location between successive pieces of processed media are non-contiguous.

14. The apparatus according to claim 11, wherein the processor is operable to:
generate the plurality of random numbers;
associate each of the plurality of random numbers with the plurality of decryption keys.

15. The apparatus according to claim 11, wherein the processor is operable to process the media retrieved from the second buffer location using the second software component, store the processed media output from the second software component in a third buffer location, different to the first and second buffer location; and reproduce the media stored at the third buffer location.

16. The apparatus according to claim 11, wherein the first and second components are arranged in a framework structure.

17. The apparatus according to claim 11, wherein the first and second components are DirectShow software components.

* * * * *